(12) United States Patent
Brütt et al.

(10) Patent No.: US 10,866,153 B2
(45) Date of Patent: Dec. 15, 2020

(54) FORCE OR TORQUE MEASURING DEVICE FOR A MOTORIZED VEHICLE WITH AN ATTACHMENT

(71) Applicant: WABCO GmbH, Hannover (DE)

(72) Inventors: Mirko Brütt, Ronnenberg (DE);
Johannes Bührke, Braunschweig (DE);
Ludger Frerichs, Sassenberg (DE);
Steffen Hanke, Hannover (DE);
Sebastian Kemper, Braunschweig (DE); Lars Thielke, Winsen/Aller (DE)

(73) Assignee: WABCO GmbH, Hannover (DE)

( * ) Notice: Subject to any disclaimer, the term of this patent is extended or adjusted under 35 U.S.C. 154(b) by 32 days.

(21) Appl. No.: 16/361,302

(22) Filed: Mar. 22, 2019

(65) Prior Publication Data

US 2019/0293505 A1    Sep. 26, 2019

(30) Foreign Application Priority Data

Mar. 22, 2018  (DE) ................... 10 2018 106 855

(51) Int. Cl.
*G01L 5/13*     (2006.01)
*A01B 63/112*   (2006.01)
(Continued)

(52) U.S. Cl.
CPC .............. *G01L 5/136* (2013.01); *A01B 63/00* (2013.01); *A01B 63/112* (2013.01); *B60D 1/00* (2013.01);
(Continued)

(58) Field of Classification Search
CPC ......... A01B 63/00; A01B 63/112; B60D 1/00; B60T 1/00; B60T 13/08; B60T 13/662;
(Continued)

(56) References Cited

U.S. PATENT DOCUMENTS 4,573,362 A * 3/1986 Amlani ................ G01L 1/2218
                                                73/862.044
4,864,874 A * 9/1989 Hafner ....................... G01L 1/02
                                                73/862.382
(Continued)

FOREIGN PATENT DOCUMENTS

DE          3907763 A1 * 9/1990 ............... B60T 7/20
DE          3935479 A1 * 5/1991 ............... G01L 1/20
(Continued)

*Primary Examiner* — Jonathan M Dunlap
(74) *Attorney, Agent, or Firm* — Dickinson Wright PLLC

(57) ABSTRACT

A measuring device (60) is configured for measuring forces or torques between a motorized vehicle (1) and a trailer or attachment which is towed or pushed thereby. The measuring device (60) has at least three sensor elements (79, 80) arranged on a carrier (71), transversely with respect to a virtual longitudinal axis of the motorized vehicle (1) and spaced apart from one another. The measuring device (60) is arranged in a coupling region between the motorized vehicle (1) and the pulled or pushed trailer or attachment. In order to transmit their measured values, the sensor elements (79, 80) are connected to an evaluation device (40), which is configured to convert these measured values into signals for force displays and/or torque displays according to magnitude and direction.

18 Claims, 6 Drawing Sheets

(51) Int. Cl.

| | | |
|---|---|---|
| *A01B 63/00* | (2006.01) | |
| *G01L 5/161* | (2020.01) | |
| *B60D 1/00* | (2006.01) | |
| *B60T 1/00* | (2006.01) | |
| *B60T 8/17* | (2006.01) | |
| *B60T 13/08* | (2006.01) | |
| *B60T 13/66* | (2006.01) | |
| *G01L 1/22* | (2006.01) | |
| *B60T 8/171* | (2006.01) | |
| *G01L 1/16* | (2006.01) | |
| *B60T 8/00* | (2006.01) | |

(52) U.S. Cl.
CPC ............... *B60T 1/00* (2013.01); *G01L 5/161* (2013.01); *B60T 8/00* (2013.01); *B60T 8/17* (2013.01); *B60T 8/171* (2013.01); *B60T 8/1708* (2013.01); *B60T 13/08* (2013.01); *B60T 13/662* (2013.01); *G01L 1/162* (2013.01); *G01L 1/2206* (2013.01); *G01L 1/2231* (2013.01)

(58) Field of Classification Search
CPC ..... B60T 7/20; B60T 8/00; B60T 8/17; B60T 8/1708; B60T 8/171; G01L 5/161; G01L 5/136; G01L 1/162; G01L 1/2206; G01L 1/2231
See application file for complete search history.

(56) References Cited

U.S. PATENT DOCUMENTS

| | | | | |
|---|---|---|---|---|
| 5,149,121 | A | * 9/1992 | Hafner | B60T 7/20 188/112 R |
| 5,213,396 | A | * 5/1993 | Avery | B60T 7/20 188/112 R |
| 6,705,684 | B1 | * 3/2004 | Garvey | B60T 7/20 303/123 |
| 2009/0032273 | A1 | * 2/2009 | Hahn | A01B 69/004 172/2 |
| 2013/0253814 | A1 | * 9/2013 | Wirthlin | G01L 11/025 701/124 |
| 2015/0290988 | A1 | * 10/2015 | Masten | B60D 1/242 280/446.1 |
| 2018/0001720 | A1 | * 1/2018 | McAllister | B60D 1/06 |

FOREIGN PATENT DOCUMENTS

| | | | | |
|---|---|---|---|---|
| EP | 0575634 | A1 * | 12/1993 | ........... G01L 3/1457 |
| EP | 0686839 | A2 * | 12/1995 | ............. B60D 1/248 |
| EP | 2251661 | A2 * | 11/2010 | ............ G01L 1/2231 |
| EP | 2280263 | A2 * | 2/2011 | ......... G01G 23/3735 |
| EP | 2348508 | A2 * | 7/2011 | ........... H04N 9/8205 |
| EP | 2 893 793 | B1 | 10/2016 | |
| GB | 2353340 | A * | 2/2001 | ............. B60T 13/66 |
| WO | WO-9102226 | A1 * | 2/1991 | ............. G01L 5/136 |

* cited by examiner

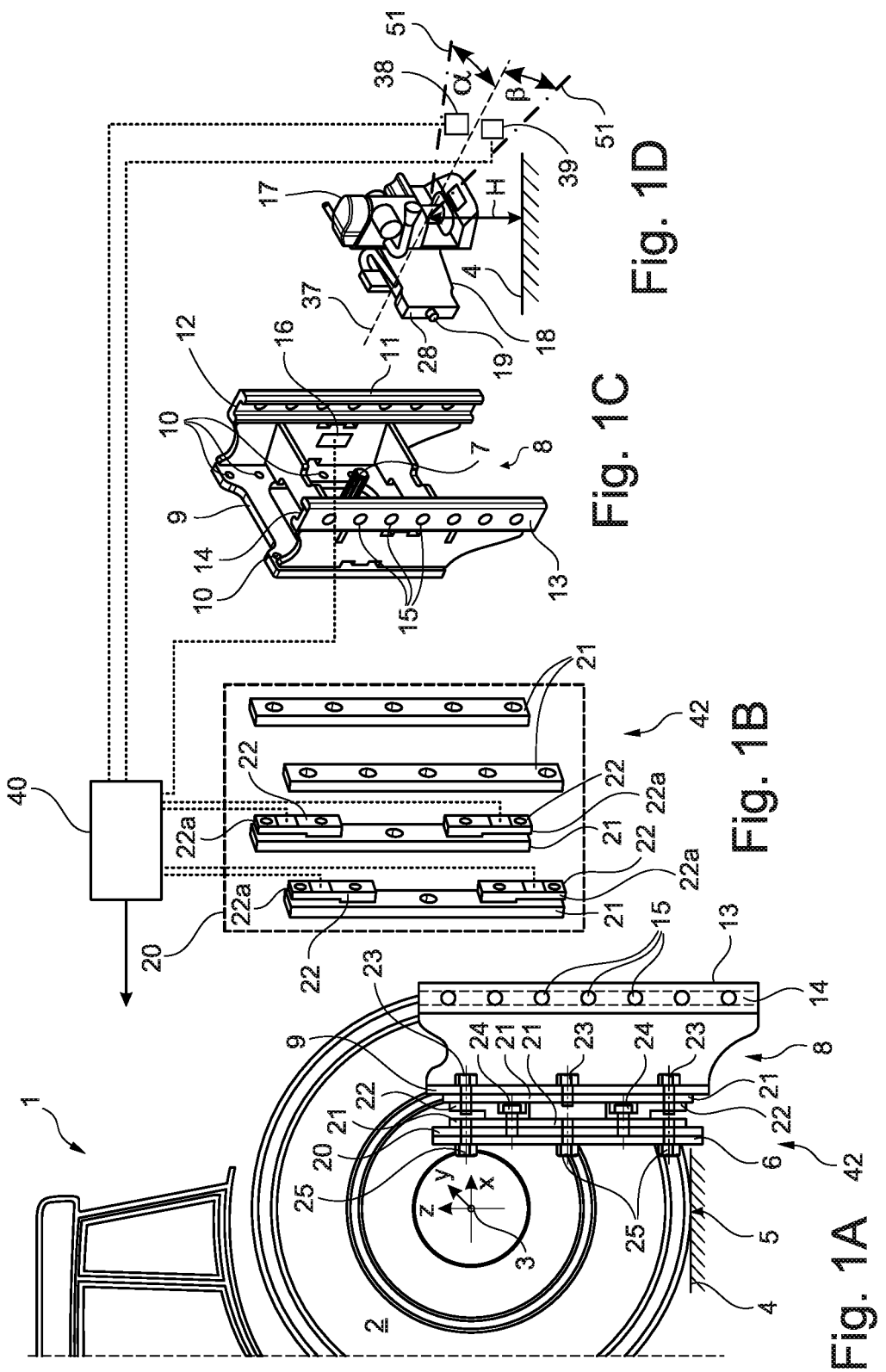

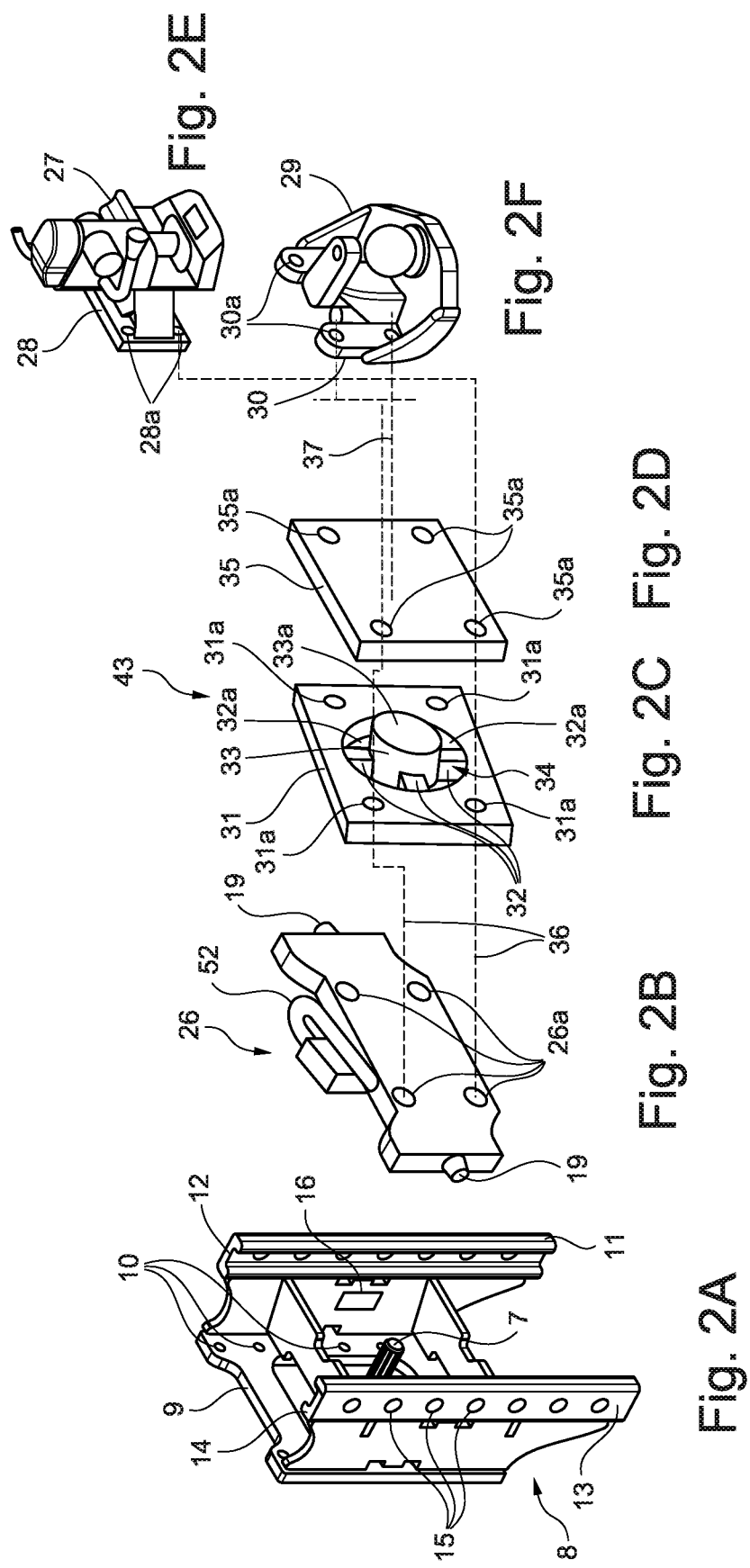

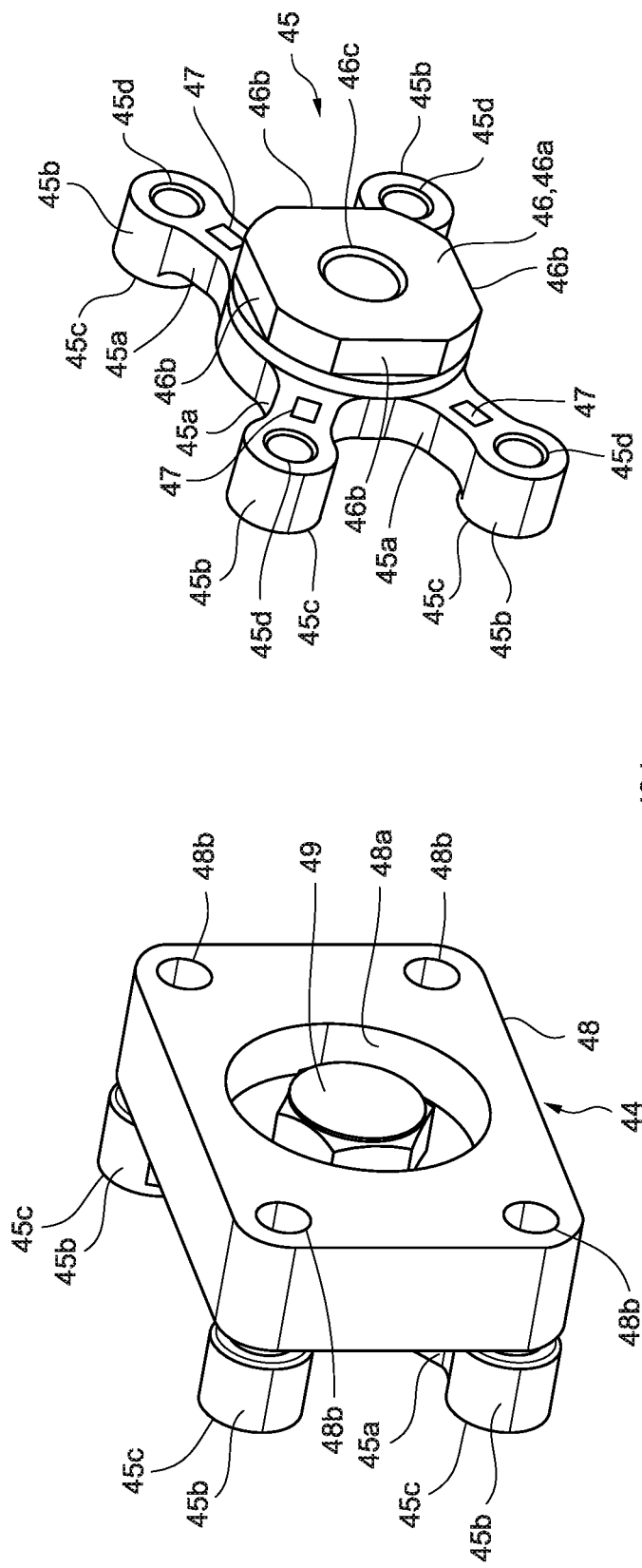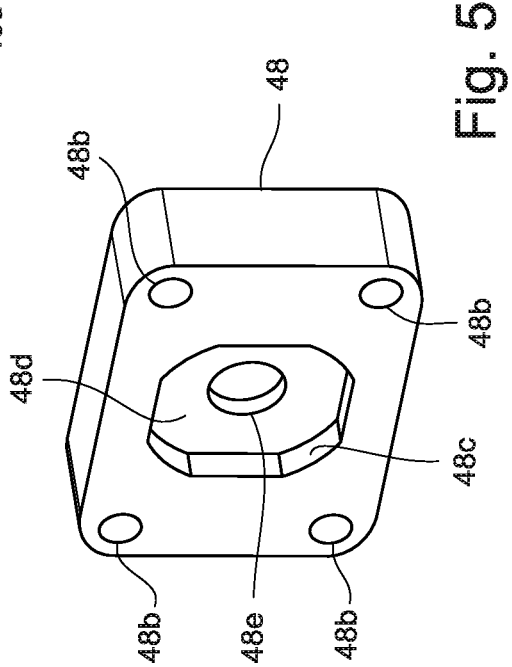

FORCE OR TORQUE MEASURING DEVICE FOR A MOTORIZED VEHICLE WITH AN ATTACHMENT

TECHNICAL FIELD

The present disclosure relates to a measuring device for measuring forces and/or torques between a motorized vehicle and the trailer or attachment towed or pushed thereby.

BACKGROUND

EP 2 893 793 B1 discloses a traction force measuring system integrated into a suspension frame of a tractor. The suspension frame is configured to be fastened to a rear frame of an agricultural tractor and has left-hand and right-hand traction connection support, wherein the left-hand and right-hand traction connection supports each couple a corresponding left-hand and a right-hand traction connection to a corresponding left-hand and right-hand side of the suspension frame. Only horizontal traction forces exerted by the left-hand and right-hand traction connections to the left-hand and right-hand traction connection supports are mechanically added. A traction force instrument transformer, arranged to protect it between the traction connections in a housing, generates therefrom a unidimensional traction force signal. The suspension frame is of a complicated design, and the traction force instrument transformer can only be used with this suspension frame. The traction force measuring system is not suitable for generating, and—if appropriate—displaying, forces and/or torques between a motorized vehicle and a trailer or attachment, towed or pushed thereby, according to magnitude and direction.

SUMMARY

Against this background, the present disclosure was based on the object of measuring coupling forces and coupling torques at the coupling point between a motorized vehicle, in particular a tractor, and a trailer or attachment, in three dimensions during driving, without special devices having to be provided for this on the trailer or attachment. In the following, a trailer is considered a specific type of attachment so that a trailer is a species within the genus of attachments.

Accordingly, the present disclosure relates to a measuring device for measuring forces and/or torques between a motorized vehicle and a trailer or attachment towed or pushed thereby.

According to the present disclosure there is provision that the measuring device has at least three sensor elements which are arranged on a carrier, transversely with respect to a virtual longitudinal axis of the motorized vehicle and spaced apart from one another, wherein the measuring device is arranged in a coupling region between the motorized vehicle and the pulled or pushed trailer or attachment, and wherein, in order to transmit their measured values, the sensor elements are connected to an evaluation device configured to convert these measured values into signals for force displays and/or torque displays according to magnitude and direction.

This measuring device is located basically in the region of the motorized vehicle, with the result that there is no need to make changes to a trailer or attachment or the coupling devices thereof. Owing to the measured values, in the form of forces and/or torques, which can be obtained in terms of absolute value and direction in all three spatial coordinates, there is provision in one development of the present disclosure that the abovementioned evaluation device is placed in a data connection with the vehicle status management system configured to detect unstable driving situations from the measured values of the sensor elements and initiate counter-steering measures. The vehicle status management system is for this purpose preferably embodied as a microcomputer which, in order to carry out counter-steering measures, is equipped with suitable software and is connected to suitable actuators and/or electromagnetic control valves in order to actuate the latter.

Furthermore, the vehicle status management system is configured in one development of the present disclosure in such a way that it is able to generate, from the measured values of the sensor element, control signals for actuators for bringing about adjustment matching of the braking effect of the motorized vehicle and of the trailer or of the attachment to one another.

According to one advantageous development of a measuring device which has the features of the present disclosure there is provision that the measuring device is mounted as a module package between a screw-on receptacle on the motorized vehicle for a standard suspension frame and this standard suspension frame, and in that a standard attachment device, such as a standard open-end coupling or a standard ball head coupling, is fastened directly to the standard suspension frame.

This standard hitch device is preferably fastened to the standard suspension frame in a detachable and vertically adjustable fashion.

Furthermore, there is preferably provision that the measuring device can be mounted as a module package on a standard suspension frame on the motorized vehicle, and is screwed to a standard attachment device, such as a standard open-end coupling or a standard ball head coupling, by means of a coupling carrier arranged on the standard suspension frame.

It is particularly advantageous if the coupling carrier is fastened to the standard suspension frame in a detachable and vertically adjustable fashion.

The measuring device according to the present disclosure can advantageously be constructed in such a way that four sensor elements serve as force sensors and are designed as load cells, strain gauges or SAW (surface acoustic wave element) elements, in that the four sensor elements are arranged on four measuring arms, offset with respect to one another by between 60° and 120° and extending radially, of a carrier in the form of a measuring cross, in that the carrier in the form of a measuring cross is coupled to a baseplate in a frictionally locking, positively locking or materially joined fashion, and in that the carrier in the form of a measuring cross is clamped in between the baseplate and a standard coupling carrier.

Furthermore, there is preferably provision that pre-stress is applied to measuring arms of the carrier in the form of a measuring cross by means of expansion screws which are arranged between a screw-on plate of a standard hitch and a standard coupling carrier.

In this context it is advantageous if there is provision that the carrier in the form of a measuring cross has, protruding axially from its measuring arms a central hub directed toward the baseplate, which is supported on the baseplate and is coupled thereto in a frictionally locking, materially joined or positively locking fashion. As a result, at the carrier in the form of a measuring cross it is in fact possible only to transmit traction forces which occur when a trailer or attachment is being towed, that is to say no thrust forces, such as can occur when a trailer or an attachment is pushed.

In order also to be able to measure these thrust forces there can be provision that at the radially outer ends of the measuring arms of the carrier in the form of a measuring cross, axial projections, facing the standard coupling carrier, are formed as spacer elements for the measuring arms with respect to the standard coupling carrier. As a result, the measuring arms of the carrier in the form of a measuring cross can move axially in both directions by means of traction forces and thrust forces, and in the process the measuring arms thereof are correspondingly deformed, with the result that three-dimensional values can be calculated for the determination of the traction forces and thrust forces as well as the torques acting on the tractor.

A structurally advantageous embodiment of the central hub consists in the fact that an axially projecting region of the central hub engages in a depression in the baseplate and is fastened therein by means of a fastening screw which engages through a drilled hole in the wall element on the baseplate. The axially projecting region, engaging in the depression in the baseplate, of the central hub can be embodied in a non-circular fashion as an anti-rotation means, that is to say can have, for example, fastened portions, for which the depression in which the axially projecting region of the central hub engages is then shaped in a correspondingly geometrically complementary fashion.

The measuring device can advantageously be attached as a module package composed of the screw-on plate, the standard hitch device, the adapter plate, the baseplate, the carrier in the form of a measuring cross and the standard coupling carrier which are braced with respect to one another by means of the expansion screws, in a vertically adjustable fashion to a standard suspension frame fastened to the motorized vehicle.

In particular, the measuring device can be embodied as a module package in such a way that it can be mounted on a standard suspension frame on the motorized vehicle and screwed to a standard hitch device, such as an open-end coupling or ball head coupling by means of a coupling carrier arranged on the standard suspension frame. It is particularly preferable if the coupling carrier is fastened to the standard suspension frame in a detachable and vertically adjustable fashion.

As a result of the operative connection between the standard suspension frame and the baseplate, the sensor elements with the measuring arms of the carrier in the form of a measuring cross are deformed by the load of the towed or pushed trailer or attachment, as a function of the magnitude and the direction of the stresses of the standard suspension frame. The signals of the sensor elements can be calculated by the evaluation device by means of known algorithms to form forces Fx, Fy, Fz in the X, Y and Z directions of a rectangular coordinate system, as can be torques Mx, My and Mz which occur. These forces and torques are dependent on the height H of the standard hitch device from the level of the ground and on an angle $\alpha$ which a tow bar of a trailer or of an attachment assumes in a horizontal transverse plane with respect to the motorized vehicle, and likewise on an angle $\beta$ which the tow bar of the trailer or of the attachment assumes in the upward or downward directions with respect to the horizontal transverse plane of the motorized vehicle.

According to a second advantageous embodiment of the measuring device according to the present disclosure, four sensor elements in the form of load cells, strain gauges or SAW elements as force sensors can be arranged in such a way that they operate on four spokes which are offset by approximately 90° with respect to one another, extend radially from a central cylindrical hub and are coupled to a carrier in the form of a measuring plate in a frictionally locking, positively locking or materially joined fashion. This carrier in the form of a measuring plate is clamped in, together with an adapter plate to which an axially protruding region of the central cylindrical hub is coupled in a positively locking fashion or materially joined fashion, between a screw-on plate of a standard hitch and a standard coupling carrier.

In this context, a pre-stress can be applied to the spokes via an axially projecting region of the cylindrical hub by means of expansion screws which are arranged between the screw-on plate of a standard hitch and the standard coupling carrier, wherein the spokes are embodied in this carrier in the form of a measuring plate as recesses which face the coupling carrier and release the spoke and permit the deformation thereof when the pre-stress is applied by means of the expansion screws.

In this case also, the measuring device can be embodied as a module package composed of the screw-on plate, the standard hitch device, the adapter plate, the carrier in the form of a measuring cross and the standard coupling carrier, which are connected to one another by means of the fastening screws in such a way that they can be attached in a vertically adjustable fashion to a standard suspension frame fastened to the motorized vehicle.

A fourth embodiment of a measuring device having the features of the present disclosure, which has proven to be particularly advantageous in tests which have been carried out, is firstly also wherein four sensor elements serve as force sensors and are embodied as load cells, strain gauges or SAW elements, and in that these sensor elements are arranged on four measuring arms, offset with respect to one another by between 60° and 120° and extending radially, of a carrier in the form of a measuring cross. In order to reduce the expenditure on components and mounting and in order to obtain particularly advantageous measurement results in respect of the direction of the forces which occur and which are to be measured, there is, however, additionally provisioned that the carrier in the form of a measuring cross is connected to a baseplate in a frictionally locking, positively locking or materially joined fashion, that a screw-on plate for a standard coupling can be screwed tight to this carrier in the form of a measuring cross, and that the baseplate can be securely connected to a standard coupling carrier.

As a result of this design, the measuring apparatus has, in addition to the necessary sensors and fastening screws, only four components, specifically the carrier in the form of a measuring cross, a screw-plate, which can be fastened to this carrier, for a standard coupling, a baseplate which can be connected to the carrier on the other axial side thereof and a coupling carrier which can be fastened to the baseplate. This will be explained in more detail below with reference to an exemplary embodiment.

In one development of this particularly favorable design there is preferably provision that the carrier in the form of a measuring cross has, protruding axially from its measuring arms, a central hub directed toward the baseplate, is supported on the baseplate and is connected thereto in a frictionally locking, materially joined or positively locking fashion. Owing to its axial length, the central, axially protruding hub provides sufficient space for the measuring arms of the carrier in the form of a measuring cross to be able to be axially freely deformed in the event of tensile loading or compressive loading of the entire device by the tractor vehicle or the trailer vehicle or an attachment.

For this purpose, axial projections are also provided on the radially outer ends of the measuring arms of the carrier in the form of a cross, which projections extend to the screw-on plate for a standard coupling and serve as spacer elements for the measuring arms with respect to the screw-on plate.

Finally, this fourth embodiment of the measuring device can also be embodied as a module package composed of the screw-on plate for a standard hitch device, of the baseplate, of the carrier in the form of a measuring cross, and of the standard coupling carrier, which are preferably connected to one another by means of fastening screws in such a way that they can be attached in a vertically adjustable fashion to a standard suspension frame fastened to the motorized vehicle.

It is apparent that different standard hitch devices which can be adjusted in height by the described vertical guide system on the suspension frame can be attached to a standard suspension frame. The transmission of the signals of the sensor elements to the motorized vehicle can be carried out via a cable connection or in a wireless fashion, for example by means of W-LAN. On the basis of the design of the measuring device according to the present disclosure, said device can be used both on agricultural vehicles, in particular agricultural tractors, and on road vehicles. Various standard hitch devices can be exchanged in a modular fashion without any changes having to be made to the measuring device. The masses of the motorized vehicle and of the trailer or attachment can also be determined by the measuring device according to the present disclosure, as a result of which the braking effects of motorized vehicles and trailers or attachments can be matched in an improved way.

The present disclosure will be explained in more detail below with reference to a plurality of exemplary embodiments which are illustrated in the appended drawings. The drawings are provided herewith for purely illustrative purposes and are not intended to limit the scope of the present invention.

BRIEF DESCRIPTION OF THE DRAWINGS

In the drawings,

FIG. 1 shows a simplified, exploded illustration of the components of a measuring device for measuring forces and/or torques between a motorized vehicle and a trailer or attachment pulled or pushed thereby;

FIG. 1A shows a partial view of a motorized vehicle in the form of a tractor with a schematic side view of the measuring device according to FIG. 1;

FIG. 1B shows an exploded isometric illustration of the measuring device according to FIG. 1A;

FIG. 1C shows an isometric illustration of a box-shaped standard suspension frame of a tractor;

FIG. 1D shows a schematic isometric illustration of a standard hitch device in the form of an open-end coupling;

FIG. 2 shows a simplified exploded isometric illustration of the components of a measuring device according to the present disclosure according to a second embodiment;

FIG. 2A shows an isometric illustration of a box-shaped standard suspension frame for a tractor;

FIG. 2B shows an isometric illustration of a standard coupling carrier with locking means;

FIG. 2C shows an isometric illustration of a measuring device on a trailer in the form of a measuring plate with a spoke wheel geometry according to FIG. 2;

FIG. 2D shows an isometric illustration of an adapter plate;

FIG. 2E shows an isometric illustration of a standard open-end coupling with standard screw-on plate;

FIG. 2F shows an alternative isometric illustration of a standard ball-head coupling with a screw-on plate;

FIG. 3 shows an isometric illustration of a measuring device according to the present disclosure with a carrier in the form of a measuring cross according to FIG. 4;

FIG. 4 shows an isometric illustration of a carrier, in the form of a measuring cross, to be braced with a baseplate, according to FIG. 3;

FIG. 5 shows an isometric rear view of the baseplate according to FIG. 4;

DETAILED DESCRIPTION OF THE DRAWINGS

Figure 2G:
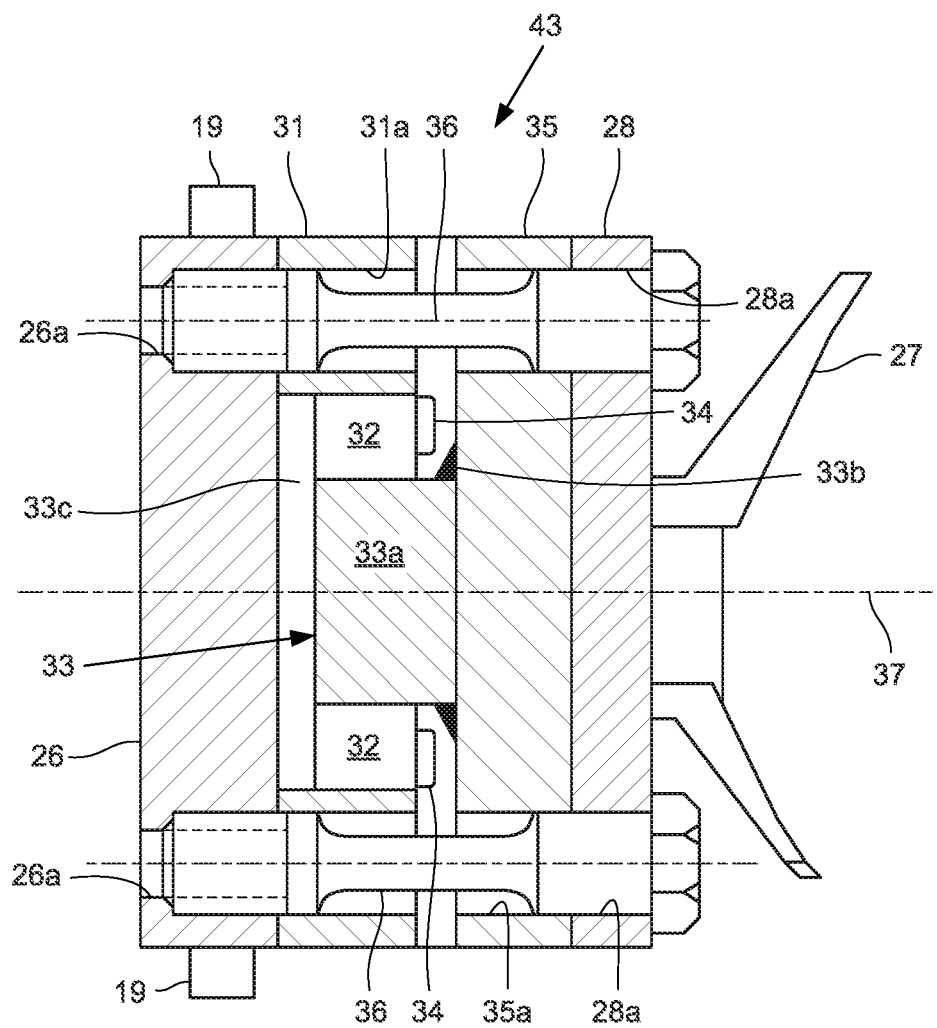
FIG. 2G shows a sectional view of the measuring device according to FIG. 2A with the elements according to FIGS. 2B to 2E.

Accordingly, FIG. 1 shows a simplified exploded illustration of the components for a measuring device 42 for measuring forces and/or torques between a motorized vehicle and a trailer or other attachment (not illustrated) towed or pushed thereby. In detail, FIG. 1A shows a partial view of a motorized traction vehicle in the form of a tractor 1, on the rear of which a box-shaped standard suspension frame 8 is screwed on, as will be explained later.

FIG. 1B shows a schematic view of a first measuring device 42 whose carrier 20 for sensor elements 22 is embodied in the form of a measuring plate and is screwed, by means of fastening screws 25, to a screw-on receptacle 6 in the form of a fastening plate on the tractor 1. A total of four sensor elements 22 are screwed tight to the carrier 20 embodied as a measuring plate, by means of countersunk fastening screws 24 via intermediately positioned fastening rails 21.

The sensor elements 22 have free-standing tongues 22a which are screwed tight to the standard suspension frame 8 via a further pair of fastening rails 21, by means of fastening screws 23. The sensor elements 22, which are connected to the evaluation device 40 in a wireless fashion or via line connections illustrated with a dotted line, are attached to the free-standing tongues 22a. The evaluation device 40 is embodied at least as an electronic circuit but preferably as a microcomputer. It can be arranged on the carrier 20 embodied as a measuring plate or on the tractor 1.

The zero point of a right-angled, three-axis coordinate system with the coordinate axes X, Y, Z is shown on a wheel rotational axis 3 of the rear wheel 2 of the tractor 1, wherein the Z axis runs through a wheel contact point 5 of the rear wheel 2 at the level of the ground 4.

The standard suspension frame 8 illustrated in a schematic side view in FIG. 1A is fastened to the tractor 1 by means of a tractor fastening plate 9 on the screw-on receptacle 6, between which the aforementioned measuring device 42 is fastened. The sensor elements 22 serve for measuring force and can be embodied as load cells, strain gauges or SAW elements (surface acoustic wave elements).

The box-shaped standard suspension frame 8 illustrated in FIG. 1C has the tractor fastening plate 9 already mentioned above and the same drilled hole pattern 10 as the fastening plate 6 on the tractor 1. A first latching rail 11 with a first latching groove 12 and a second latching rail 13 with a second latching groove 14 are attached, parallel to one another, on side walls of the standard suspension frame 8, the latching grooves 12, 14 of which latching rails 11, 13 are opened in such a way that they point to one another. Along the two latching grooves 12, 14 drilled holes 15 are formed for locking means 19 in the form of locking pins, into which drilled holes 15, for example, the locking pins 19 engage on a latching plate 18 of a standard open-end coupling 17 and secure the latter to a height H from the level of the ground 4. A sensor 16 for detecting the height H of the standard coupling 17 is arranged on a side wall of the standard suspension frame 8.

Furthermore, according to FIG. 1D a sensor element 38 is present which measures the angle α between a tow bar 51 of a trailer or other attachment and a straight line running through a central longitudinal axis of the tractor 1 at the height H in the X direction, in a horizontal transverse plane 37 at the height H of the standard coupling 17. Furthermore, there is a further sensor element 39 for measuring the angle β in the upward or downward directions between the tow bar 51 of a trailer or other attachment and a horizontal transverse plane at the height H in the X direction.

The specified sensor elements 16, 38, 39 are also connected to the evaluation device 40 in a wireless fashion or via the leads illustrated by dotted lines but are not denoted further. Therefore, the evaluation device 40 can calculate, by means of known algorithms, both the forces Fx, Fy, Fz which act on the measuring device 20 and the corresponding torques Mx, My, Mz from the signals of the sensor elements 16, 22, 38, 39 in terms of magnitude and direction and pass them on to a driving state management system. This driving state management system can detect unstable driving situations by deriving them from the signals of the sensor elements 16, 22, 38, 39 and initiate counter-steering measures. Likewise, it is possible to adjust the braking effect of the tractor 1 and of the trailer or of the other attachment on the basis of the signals of the sensor elements 16, 22, 38, 39. The driving state management system is embodied, for example, as a computer program and is stored in a separate microcomputer or in an evaluation device 40 as software.

The measuring device 42 can both be mounted as a module package between the tractor 1 and the standard suspension frame 8 and inserted, with the carrier 20 embodied as a measuring plate, into the latching grooves 12, 14 of the standard suspension frame 8 and secured therein at the aforementioned height H, wherein a standard hitch device 27 in the form of an open-end coupling according to FIG. 2E is then screwed with its screw-on plate 28 to the carrier 20. For this purpose, the screw-on plate 28 of the standard hitch device 27 has a congruent standard hole pattern 28a like the carrier 20.

A power take-off shaft 7, which can be seen in FIG. 1C, can be used to drive secondary assemblies only if it is not locked by the measuring device 42. If appropriate, the carrier 20 in the form of a measuring plate has a through-opening for the power take-off shaft 7.

A second embodiment of the measuring device 43 according to the present disclosure is illustrated in FIG. 2, FIG. 2A of which shows the box-shaped standard suspension frame 8, which is also illustrated in FIG. 1C. This measuring device 43 has a carrier 31 in the form of a measuring plate with the standard hole pattern 31a, which is congruent with a standard hole pattern 26a of threaded drilled holes in a standard coupling carrier 26. The standard coupling carrier 26 can, as already described, be inserted into the latching grooves 12, 14 of the standard suspension frame 8 and secured in the drilled holes 15 of the standard suspension frame 8 by means of locking means 19 in the form of the locking pins on the standard coupling carrier 26.

As is apparent from FIG. 2C, the carrier 31 in the form of a measuring plate preferably has radial spokes 32, formed integrally on the latter and arranged in a plane at an angle of 90° with respect to one another. Free spaces 32a are therefore formed between the radial spokes 32 and the carrier 31, in order to permit the radial spokes 32 to deform in the direction of the horizontal transverse plane 37.

The spokes 32 are connected radially on the inside to a central cylindrical hub 33 whose axially protruding region 33a is connected in a materially joined fashion to an adapter plate 35, preferably by means of a welded seam 33b (FIG. 2G). The carrier 31 in the form of a measuring plate has, as mentioned above, a standard hole pattern 31a congruent with the standard hole pattern 26a on the standard coupling carrier 26. The adapter plate 35 also has such a standard hole pattern 35a.

Sensor elements 34 in the form of load cells, strain gauges or SAW elements are attached as force sensors to the radial spokes 32, which force sensors are connected to the evaluation device 40 in a wireless fashion or by means of cables, in the way illustrated in FIG. 1. The radio transmission of the acquired measured values of the sensor elements 34 can also be carried out by means of a relevant transmitter connected to an antenna 52 arranged on the upper side of the standard coupling carrier 26.

The carrier 31 in the form of a measuring plate is clamped in, with the adapter plate 35 to which the axially projecting region 33a of the central cylindrical hub 33 is coupled in a positively locking or materially joined fashion between a screw-on plate 28 on a standard open-end coupling 27 or a screw-on plate 30 on a standard ball head coupling 29 and a standard coupling carrier 26 with pre-stress of the spokes 32.

The pre-stress of the spokes 32 is applied by means of expansion screws 36 arranged between the screw-on plate 28, 30 of a standard hitch 27, 29 and the standard coupling carrier 26. The screw-on plates 28, 30 of the standard hitch 27 and the standard ball head coupling 29 each have for this purpose a congruent standard hole pattern 28a, 30a for leading through expansion screws 36.

As is shown in FIG. 2G, recesses or free spaces 33c which release the spokes 32 and permit the deformation thereof when the pre-stress is applied by means of the expansion screws 36, are formed in the carrier 33 in the form of a measuring plate. As a result, a deformation of the spokes 32 in the direction of the standard clutch carrier 26 can be brought about by means of a thrust force which acts on the standard hitch 27, with the result that this thrust force and the pre-stress applied by the expansion screws 36 can be measured by means of the sensor elements 34.

Figure 7:
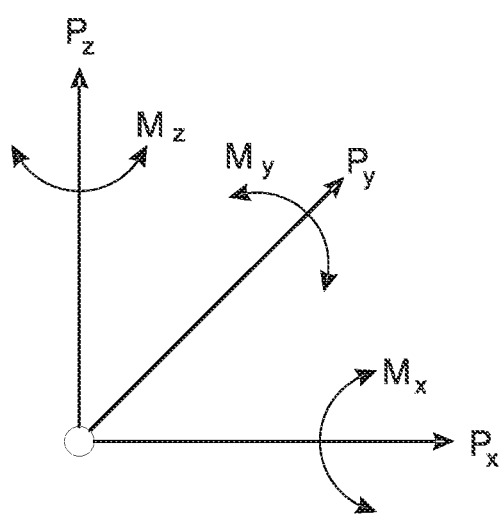
FIG. 7 shows a right-angled, three-dimensional coordinate cross with indicated forces Fx, Fy, Fz and torques Mx, My, Mz.

Conversely, a movement of the adapter plate 35 and therefore of the central cylindrical hub 33a is caused by a traction force applied to the standard hitch 27. This brings about corresponding release of the stress of the radial spokes 32, which can also be detected by means of the sensor elements 34 and owing to the arrangement of the four radial spokes 32 offset by 90° gives rise to signals, which, when viewed together, result in values for the applied forces Fx, Fy, Fz in the X, Y and Z directions and the corresponding torques Mx, My, Mz as illustrated in FIG. 7, by means of a corresponding algorithm of the evaluation device 40.

Figure 6:
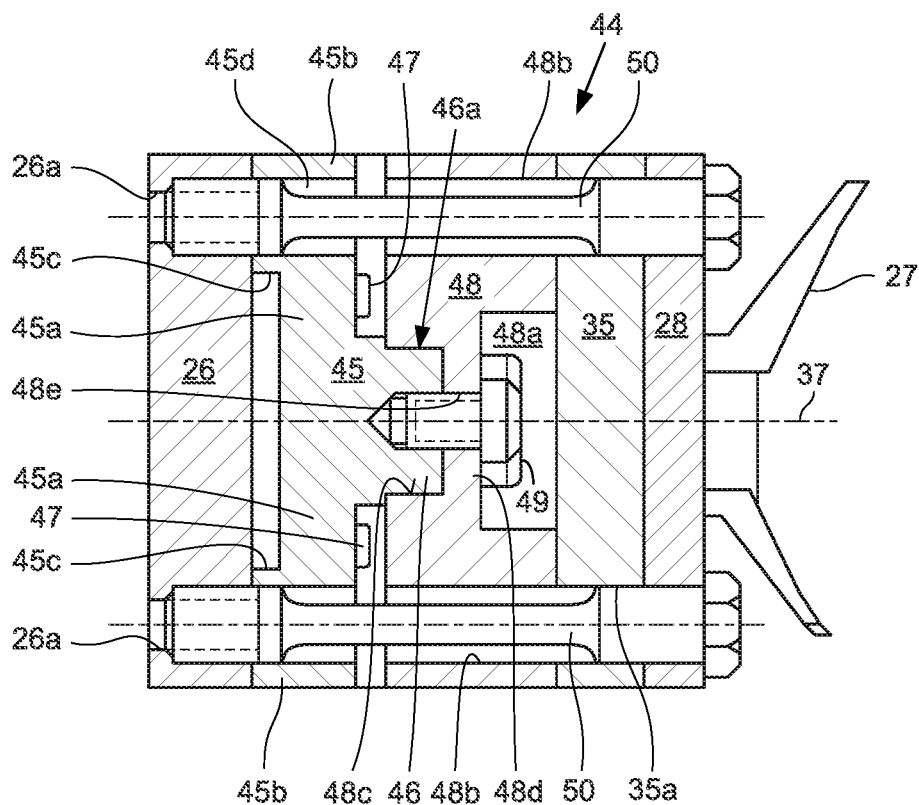
FIG. 6 shows a sectional view of the assembled measuring device according to FIGS. 3 to 5.

The third embodiment of a variant of the measuring device 44 illustrated in FIGS. 3 to 6 has a carrier 45 in the form of a measuring cross with in each case two measuring arms spaced apart by 60° or 120° whose free ends have eyelets 45b with drilled through-holes 45d and which are provided at the free ends with axial projections 45c whose function is explained in conjunction with FIG. 6. The carrier 45 in the form of a measuring cross is provided with a central hub 46 embodied in an substantially cylindrical fashion but is provided with flattened portions 46b at a region 46a which projects axially on one side. This axially projecting region 46a with its flattened portions 46b can be inserted in a non-circular depression 48c, congruent with the hub 46, in a baseplate 48, as a result of which the carrier 45 in the form of a measuring cross is secured against rotation with respect to the baseplate 48. The non-circular depression 48c of the baseplate 48 ends axially at a wall element 48d with a central drilled through-hole 48e for a fastening screw 49 which is illustrated in FIG. 3 and is screwed into a threaded drilled hole 46c in the central hub 46 of the carrier 45 in the form of a measuring cross.

On its rear side remote from the measuring cross, the baseplate 48 has a cylindrical depression 48a into which the head of the fastening screw 49 can be lowered. Furthermore, FIGS. 3 and 5 show clearly that the baseplate 48 has four drilled through-holes 48b for leading through the already mentioned expansion screws 50 which are also led through the drilled through-holes 45d of the carrier 45 and are ultimately screwed in the threaded drilled holes 26a of the standard coupling carrier 26 which can be seen clearly in FIG. 6.

In each case sensor elements 47 in the form of load cells, strain gauges or SAW elements are arranged on the measuring arms 45a as force sensors between the eyelets 45b at the free ends of the four measuring arms 45a and of the central hub 46 of the carrier 45, and are connected, in a way corresponding to FIG. 1, to the evaluation device 40 in a wireless fashion or by means of cables, as are also the other sensor elements. The measuring device 44 according to FIGS. 3 to 6 can also be attached, as a module package composed of the screw-on plate 28, 30 of the standard hitch device 27, 29, the adapter plate 35, the baseplate 48, the carrier 45 in the form of a measuring cross and the standard coupling carrier 26 which are braced with respect to one another by means of the expansion screws 50, in a vertically adjustable fashion to a standard suspension frame 8 fastened to the motorized vehicle 1.

Figure 8:
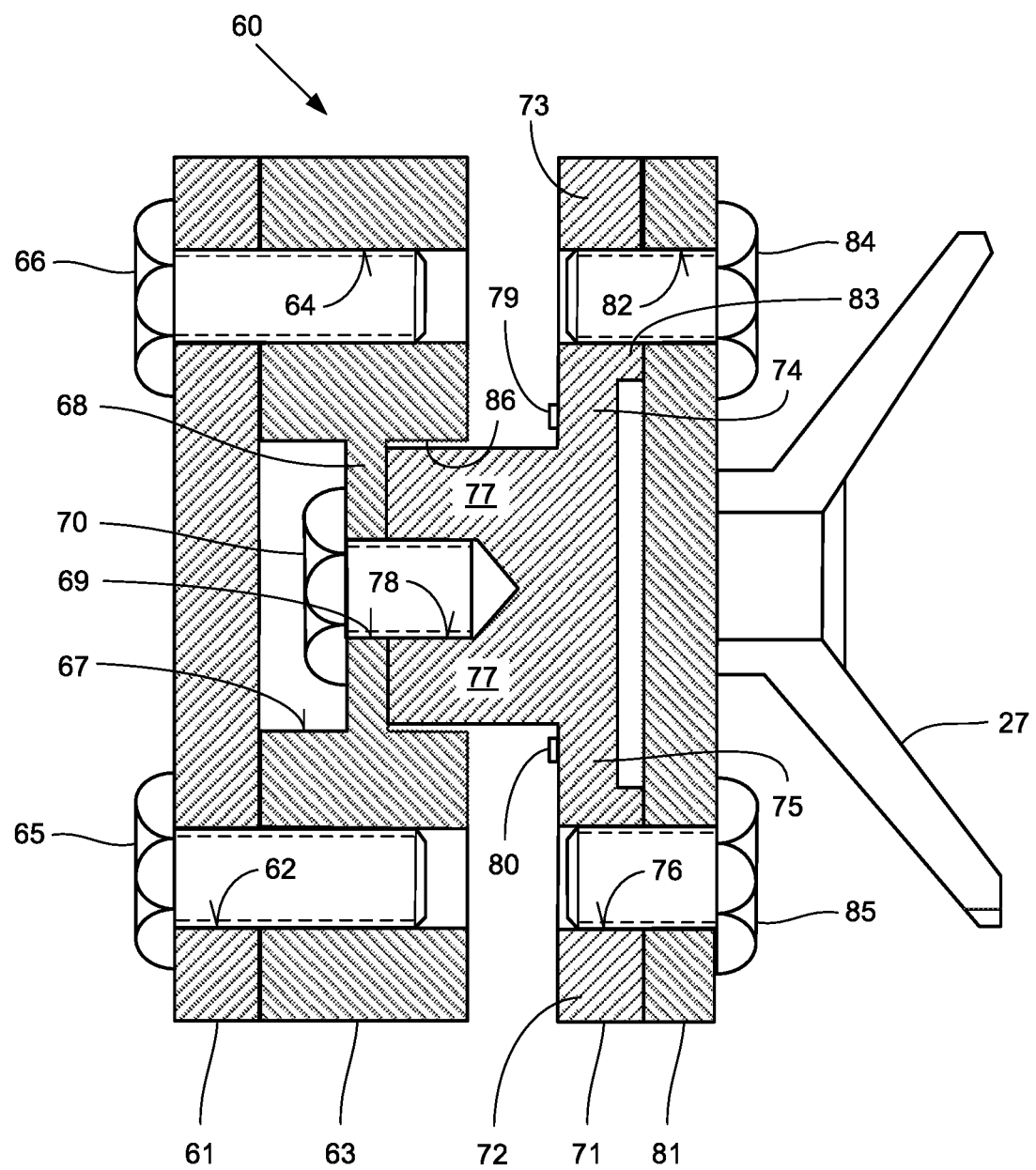
FIG. 8 shows an axial sectional view of the assembled measuring device similarly to FIG. 6.

The fourth embodiment, illustrated in an axial sectional view in FIG. 8, of a measuring device 60 having the features of the present disclosure advantageously has only a very small number of components, which has a favorable influence on the manufacturing costs and the expenditure on the mounting. In addition, with this measuring device 60 is possible to measure particularly well not only the axial components of the compressive forces and traction forces between a traction vehicle and a hitch device or other attachment but also the spatial components thereof.

For this purpose, the measuring device 60 has a carrier 71 in the form of a measuring cross, which also has four sensor elements 79, 80 which serve as force sensors and are preferably embodied as load cells, strain gauges or SAW elements. The four sensor elements 79, 80 are arranged on four measuring arms 74, 75, offset with respect to one another by between 60° and 120° and extending radially, of the carrier 71 and they have a signal-transmitting connection to an evaluation device 40, as already described above. The carrier 71 in the form of a measuring cross has, radially on the inside, a central hub 77 which extends axially by a certain distance toward a baseplate 63. The hub 77 has a non-circular geometry with which it is accommodated in a non-circular depression 86, complementary with respect to the latter, in the baseplate 63. As a result, an anti-rotation means is provided. The fastening screw 70 serves to connect the baseplate 63 in a frictionally locking fashion to the carrier 71 in the form of a measuring cross, said fastening screw 70 being screwed into a threaded drilled hole 69 in a central wall element 68 of the baseplate 63 and into a threaded drilled hole 78 in the hub 77 of the carrier 71 in the form of a measuring cross. In order to avoid axial protrusion of this fastening screw 70, the screw head thereof is accommodated in a central, axial and cylindrical depression 67 in the baseplate 63.

The baseplate 63 itself is securely connected at its side remote from the sensor to a coupling carrier 61. The fastening screws 65, 66, serve for this purpose and are screwed into threaded drilled holes 62 in the coupling carrier 61 and into the threaded drilled holes 64 in the baseplate 63.

The carrier 71 in the form of a measuring cross is securely connected, remotely from the baseplate, to a screw-on plate 81 which has a traction-vehicle-side part of a standard hitch 27. The connection of the carrier 71 to this screw-on plate 81 is implemented by means of fastening screws 84, 85 screwed into threaded drilled holes 82 in the screw-on plate 81 and into threaded drilled holes 76 in the eyelets 72, 73, formed radially in the outside, of the carrier 71 in the form of a measuring cross.

In this embodiment of the measuring device 60 according to the present disclosure there is also provision that, at the radially outer ends of the measuring arms 74, 75 of the carrier 71 in the form of a measuring cross, axial projections 83, facing the screw-on plate 81 for the standard coupling 27, are formed on the abovementioned eyelets 72, 73 and serve as spacer elements for the measuring arms 74, 75 with respect to the screw-on plate 81.

From FIG. 8 it is apparent that this measuring device 60 can be attached very easily as a module package in a vertically adjustable fashion on a standard suspension frame 8 fastened to the motorized vehicle 1. This module package comprises, in addition to the necessary sensors 79, 80 and fastening screws 65, 66, 70, 84, 85, only from the four components of the screw-on plate 81 with the standard hitch device 27, carrier 71 in the form of a measuring cross, baseplate 48 and coupling carrier 61.

LIST OF REFERENCE SYMBOLS (PART OF THE DESCRIPTION)

1 Motorized vehicle (tractor)
2 Rear wheel
3 Wheel rotation axis
4 Level of the ground
5 Wheel contact point
6 Screw-on receptacle (fastening plate on the tractor)
7 Power take-off shaft
8 Standard suspension frame, box-shaped
9 Tractor fastening plate on suspension frame
10 Drilled hole pattern on standard suspension frame
11 First latching rail on standard suspension frame
12 First latching groove
13 Second latching rail on standard suspension frame
14 Second latching groove
15 Drilled holes for locking means in latching rail 16 Sensor element for detecting the coupling height H
17 Standard open-end coupling
18 Latching plate on open-end coupling
19 Locking means (latching pin)
20 Carrier in the form of a measuring plate
21 Fastening rails
22 Sensor elements
22a Free-standing tongues of sensor elements 22
23 Fastening screws
24 Countersunk fastening screws
25 Fastening screws
26 Standard coupling carrier with locking means
26a Standard hole pattern of threaded drilled holes on coupling carrier 26
27 Standard open-end coupling
28 Standard screw-on plate on open-end coupling 27
28a Standard hole pattern of drilled through-holes in screw-on plate 28
29 Standard ball head coupling
30 Standard screw-on plate on ball head coupling 29
30a Standard hole pattern of drilled through-holes in screw-on plate 30
31 Carrier in the form of a measuring plate
31a Standard hole pattern of drilled through-holes in carrier 31
32 Radial spokes on carrier 31
32a Free space between spokes 32
33 Central cylindrical hub on carrier 31
33a Axially projecting region of hub 33
33b Welded seam
33c Recess in carrier 31
34 Sensor elements on spokes
35 Adapter plate
35a Standard hole pattern of drilled through-holes in adapter plate 35
36 Expansion screws
37 Horizontal transverse plate through a longitudinal axis of the tractor at height H of the standard coupling 17, in the direction of the X axis
38 Sensor element for measuring angle α
39 Sensor element for measuring angle β
40 Evaluation device
42 First embodiment of a measuring device
43 Second embodiment of a measuring device
44 Third embodiment of a measuring device
45 Carrier in the form of a measuring cross
45a Measuring arms on carrier 45
45b Eyelets on measuring arms 45a
45c Projections on eyelets 45b
45d Drilled through-holes in eyelets 45b
46 Central hub of carrier 45
46a Region of the hub 46 projecting axially on one side
46b Flattened portions on hub 46
46c Threaded drilled hole in hub 46
47 Sensor elements on measuring arms 45a
48 Baseplate
48a Cylindrical depression in baseplate 48
48b Drilled through-holes in baseplate 48
48c Non-circular depression in baseplate 48
48d Wall element of baseplate 48
48e Central drilled hole in baseplate 48
49 Fastening screw
50 Expansion screws
51 Tow bar of the trailer or of attachment
52 Antenna
60 Fourth embodiment of a measuring device
61 Standard coupling carrier
62 Threaded drilled hole in coupling carrier 61
63 Baseplate
64 Threaded drilled hole in baseplate 63
65 Fastening screw
66 Fastening screw
67 Cylindrical depression in baseplate 63
68 Wall element of baseplate 63
69 Threaded drilled hole in wall element 68
70 Fastening screw
71 Carrier in the form of measuring cross
72 Eyelet of carrier 71
73 Eyelet of carrier 71
74 Measuring arm of carrier 71
75 Measuring arm of carrier 71
76 Threaded drilled hole in eyelet of carrier 71
77 Central hub of carrier 71
78 Threaded drilled hole in hub of carrier 71
79 Sensor element on measuring arm 74
80 Sensor element on measuring arm 75
81 Screw-on plate for standard open-end coupling 27
82 Threaded drilled hole in screw-on plate 81
83 Projection on eyelet 73
84 Fastening screw
85 Fastening screw
86 Non-circular depression in baseplate 63
H Distance of standard hitch on tractor from level of ground
X, Y, Z Coordinate axes
α Angle between a tow bar of a trailer or attachment and a straight line running through a central longitudinal axis of a trailer at height H in X direction
β Angle in upward or downward direction between a drawbar of a trailer or attachment and a horizontal transverse plane at height H in X direction

What is claimed is:

1. A measuring device (42, 43, 44, 60) for measuring forces or torques between a motorized vehicle (1) and an attachment towed or pushed thereby, the measuring device (42, 43, 44, 60) comprising:
a carrier (20, 31, 45, 71);
an evaluation device (40); and
at least three sensor elements (22, 34, 47, 79, 80) arranged on the carrier (20, 31, 45, 71), transversely with respect to a virtual longitudinal axis of the motorized vehicle (1) and spaced apart from one another,
wherein the measuring device (42, 43, 44, 60) is arranged in a coupling region between the motorized vehicle (1) and the attachment,
and wherein the sensor elements (22, 34, 47, 79, 80) are connected to the evaluation device (40) and configured to transmit measured values,
the evaluation device (40) being configured to convert the measured values into signals for displaying at least one quantity representing a force or a torque according to magnitude and direction,
wherein the at least three sensor elements are four sensor elements (47) serving as force sensors and are configured as load cells, strain gauges or SAW elements,
wherein the four sensor elements (47) are arranged on four measuring arms (45a), offset with respect to one another by between 60° and 120° and extending radially, of a carrier (45) in the form of a measuring cross,
wherein the carrier (45) is a measuring cross coupled to a baseplate (48) in a frictionally locking, positively locking or materially joined fashion,
and the carrier (45) is clamped in between the baseplate (48) and a standard coupling carrier (26).

2. The measuring device (42, 43, 44, 60) as claimed in claim 1, wherein the evaluation device (40) has a data connection to a driving state management system, which is configured to detect unstable driving situations from the measured values of the sensor elements (22, 34, 47, 79, 80) and to initiate counter-steering measures.

3. The measuring device (42, 43, 44, 60) as claimed in claim 2, wherein the driving state management system is configured to generate, from the measured values from the sensor elements (22, 34, 47, 79, 80), control signals for actuators for bringing about an adjustment matching of the braking effect of the motorized vehicle (1) and of the trailer or of the attachment to one another.

4. The measuring device (42, 43, 44, 60) as claimed in claim 1, wherein the measuring device (42, 43, 44, 60) is mounted on the motorized vehicle (1) as a module package between a standard suspension frame (8) and a screw-on receptacle (6) for the standard suspension frame (8), and a standard attachment device (17, 27, 29) is fastened directly to the standard suspension frame (8).

5. The measuring device (42, 43, 44, 60) as claimed in claim 4, wherein the standard attachment device (17, 27, 29) is a standard open-end coupling (17, 27) or a standard ball head coupling (29).

6. The measuring device (42, 43, 44, 60) as claimed in claim 4, wherein the standard attachment device (17, 27, 29) is fastened to the standard suspension frame (8) in a detachable and vertically adjustable fashion.

7. The measuring device (42, 43, 44, 60) as claimed in claim 1, wherein the measuring device (42, 43, 44, 60) in configured to be mounted on the motorized vehicle (1) as a module package on a standard suspension frame (8) and is screwed to a standard attachment device (17, 27, 29) via a coupling carrier (26) arranged on the standard suspension frame (8).

8. The measuring device (42, 43, 44, 60) as claimed in claim 7, wherein the standard attachment device (17, 27, 29) is a standard open-end coupling (17, 27) or a standard ball head coupling (29).

9. The measuring device (42, 43, 44, 60) as claimed in claim 7, wherein the coupling carrier (26, 61) is fastened to the standard suspension frame (8) in a detachable and vertically adjustable fashion.

10. The measuring device (44) as claimed in claim 1, wherein pre-stress is applied to the measuring arms (45a) of the carrier (45) via expansion screws (50) arranged between a screw-on plate (28) of a standard hitch (27, 29) and a standard coupling carrier (26).

11. The measuring device (44, 60) as claimed in claim 1, wherein the carrier (45, 71) has, protruding axially from the measuring arms (45a, 74, 75) a central hub (46, 77) directed toward the baseplate (48, 63) and supported on the baseplate (48, 63), the central hub being coupled to the baseplate (48, 63) in a frictionally locking, materially joined or positively locking fashion.

12. The measuring device (44) as claimed in claim 1, wherein, at radially outer ends of the measuring arms (45a) of the carrier (45), axial projections (45c) facing the standard coupling carrier (26) are formed as spacer elements for the measuring arms (45a) with respect to the standard coupling carrier (26).

13. The measuring device (44, 60) as claimed in claim 1, wherein the central hub (46, 77) engages in a depression (48c, 86) in the baseplate (48, 63) and is fastened therein by a fastening screw (49, 70), which engages a wall element (48d, 68) of the baseplate (48, 63) through a drilled hole (48e, 69).

14. The measuring device (44) as claimed in claim 1, wherein the measuring device (44) is embodied as a module package composed of the screw-on plate (28, 30), the standard hitch device (27, 29), the adapter plate (35), the baseplate (48), the carrier (45) in the form of a measuring cross, and the standard coupling carrier (26) which are braced with respect to one another by the expansion screws (50), in such a way that the module package is configured to be attached in a vertically adjustable fashion to a standard suspension frame (8) fastened to the motorized vehicle (1).

15. The measuring device (60) as claimed in claim 1, wherein the measuring device (60) is embodied as a module package composed of the screw-on plate (81), the standard hitch device (27, 29), the baseplate (48), the carrier (71) in the form of a measuring cross and the standard coupling carrier (61), which are connected to one another by fastening screws (65, 66, 70, 84, 85), in such a way that the module package is configured to be attached in a vertically adjustable fashion to a standard suspension frame (8) fastened to the motorized vehicle (1).

16. A measuring device (42, 43, 44, 60) for measuring forces or torques between a motorized vehicle (1) and an attachment towed or pushed thereby, the measuring device (42, 43, 44, 60) comprising:

a carrier (20, 31, 45, 71);
an evaluation device (40); and
at least three sensor elements (22, 34, 47, 79, 80) arranged on the carrier (20, 31, 45, 71), transversely with respect to a virtual longitudinal axis of the motorized vehicle (1) and spaced apart from one another,
wherein the measuring device (42, 43, 44, 60) is arranged in a coupling region between the motorized vehicle (1) and the attachment,
and wherein the sensor elements (22, 34, 47, 79, 80) are connected to the evaluation device (40) and configured to transmit measured values,
the evaluation device (40) being configured to convert the measured values into signals for displaying at least one quantity representing a force or a torque according to magnitude and direction,
wherein the at least three sensor elements are four sensor elements (79, 80) serving as force sensors and embodied as load cells, strain gauges or SAW elements,
the four sensor elements (79, 80) being arranged on four measuring arms (74, 75) of a carrier (71) in the form of a measuring cross, the four measuring arms being offset with respect to one another by between 60° and 120° and extending radially,
wherein the carrier (71) is connected to the baseplate (63) in a frictionally locking, positively locking or materially joined fashion,
wherein a screw-on plate (81) for a standard coupling (27, 29) is fastened to the carrier (71), and
wherein the baseplate (63) is configured to be securely connected to a standard coupling carrier (61).

17. The measuring device (60) as claimed in claim 16, wherein at radially outer ends of the measuring arms (74, 75) of the carrier (71), axial projections (83), facing the screw-on plate (81) for a standard coupling (27, 29) are embodied as spacer elements for the measuring arms (74, 75) with respect to the screw-on plate (81).

18. The measuring device (60) as claimed in claim 16, wherein the measuring device (60) is embodied as a module package composed of the screw-on plate (81), the standard hitch device (27, 29), the baseplate (48), the carrier (71) in the form of a measuring cross and the standard coupling carrier (61), which are connected to one another by fastening screws (65, 66, 70, 84, 85), in such a way that the module package is configured to be attached in a vertically adjustable fashion to a standard suspension frame (8) fastened to the motorized vehicle (1).

\* \* \* \* \*